US008188674B2

(12) United States Patent
Chung et al.

(10) Patent No.: US 8,188,674 B2
(45) Date of Patent: May 29, 2012

(54) LED LIGHT EMITTING DEVICE AND DRIVING METHOD THEREOF

(75) Inventors: Jin-Hwa Chung, Bucheon (KR); Iiyong Jung, Bucheon (KR); Chan Son, Seoul (KR); Jaewoon Kim, Goyang-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 259 days.

(21) Appl. No.: 12/791,281

(22) Filed: Jun. 1, 2010

(65) Prior Publication Data

US 2010/0327758 A1  Dec. 30, 2010

(30) Foreign Application Priority Data

Jun. 26, 2009 (KR) ................. 10-2009-0057914

(51) Int. Cl.
*H05B 41/16* (2006.01)
(52) U.S. Cl. ..... 315/247; 315/224; 315/291; 315/185 S; 315/312
(58) Field of Classification Search ............. 315/247, 315/224, 225, 291, 307–311, 185 S
See application file for complete search history.

(56) References Cited

U.S. PATENT DOCUMENTS 3,480,864 A * 11/1969 Murphy ............... 324/762.07
2011/0285323 A1* 11/2011 Kuo et al. ................. 315/307

* cited by examiner

*Primary Examiner* — Tuyet Thi Vo
(74) *Attorney, Agent, or Firm* — Okamoto & Benedicto LLP (57) ABSTRACT

The present invention relates to an LED light emitting device and a driving method, and discloses a technology that may improve a slew rate of a channel current flowing through an LED channel when driving with a pulse width modulation method. For this, the present invention includes an LED channel consisting of a plurality of LED elements that are consecutively and serially connected, a current control switch that is connected to the end of the LED channel and performs a switching operation, and an operational amplifier that controls the switching operation of the current control switch according to a pulse width modulation signal. The LED driver samples an output voltage at the operational amplifier when the pulse width modulation signal is in an on state, and maintains the output voltage of the operational amplifier when the pulse width modulation signal is in an off state.

10 Claims, 6 Drawing Sheets

LED LIGHT EMITTING DEVICE AND DRIVING METHOD THEREOF

CROSS-REFERENCE TO RELATED APPLICATION

This application claims priority to and the benefit of Korean Patent Application No. 10-2009-0057914 filed in the Korean Intellectual Property Office on Jun. 26, 2009, the entire contents of which are incorporated herein by reference.

BACKGROUND OF THE INVENTION (a) Field of the Invention

The present invention relates to an LED light emitting device and a driving method. More particularly, the present invention relates to an LED light emitting device applying a pulse width modulation method, and a driving method thereof.

(b) Description of the Related Art

An LED light emitting device includes an LED channel consisting of a plurality of LED elements that are arranged in series, and a constant current source for controlling a current flowing through the LED channel. The constant current source includes a sink current source, and the sink current source controls a flowing current through each of the LED channel by using an operational amplifier to be constant.

There are an analog method and a pulse width modulation method to control brightness of the LED element. The analog method controls the size of a continuously flowing current through the LED element. The pulse width modulation method controls a pulse width of a current that has a constant size and discontinuously flows through the LED element. The analog method has a change of color coordinate when a current flowing through the LED element is small, but since the pulse width modulation method has no change of color coordinate, the pulse width modulation method is mainly used.

Figure 1:
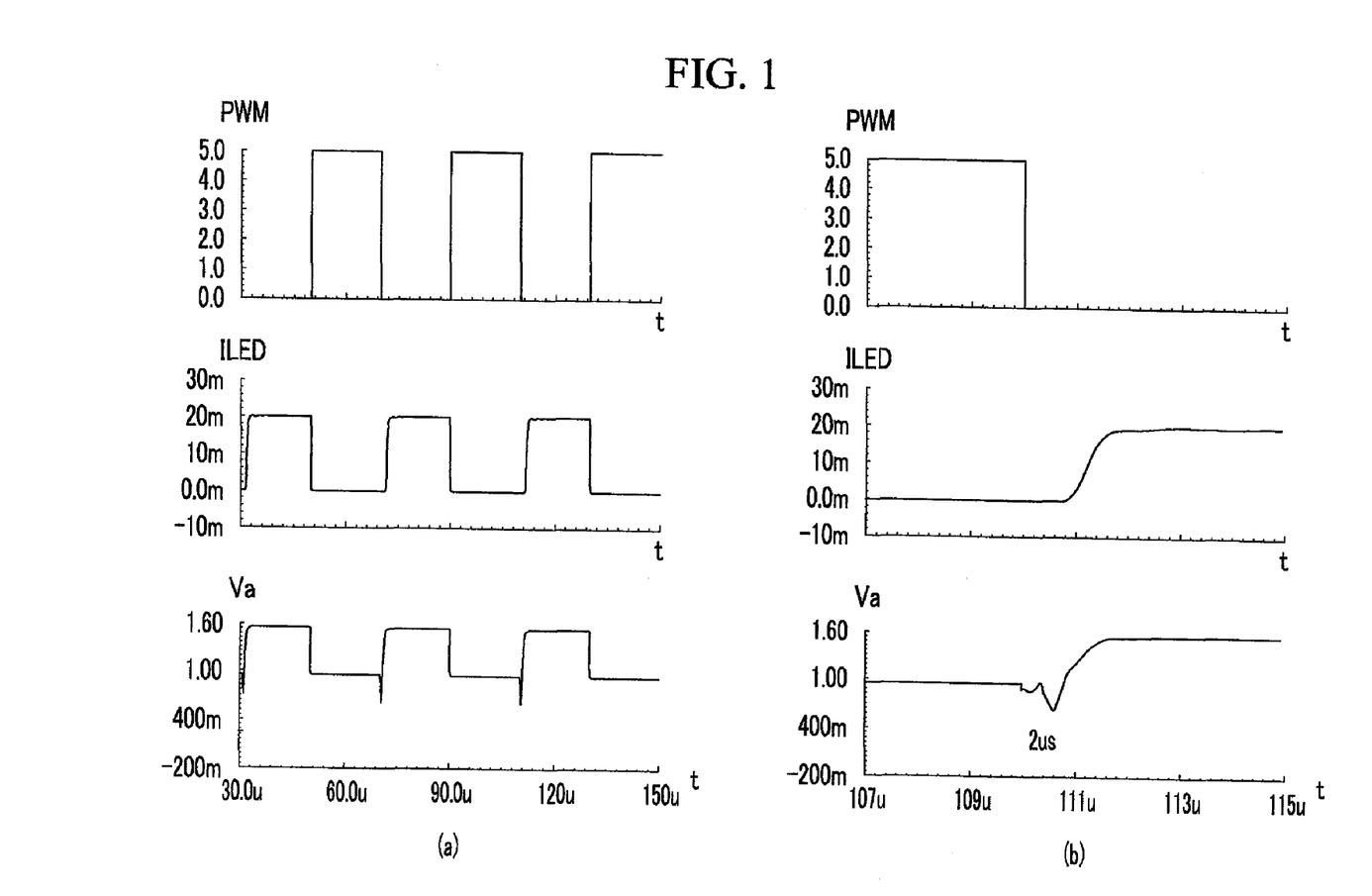
FIG. 1 is a waveform diagram showing a pulse width modulation signal, a channel current flowing through an LED channel, and an output voltage at an operational amplifier.

FIG. 1 is a waveform diagram showing a pulse width modulation signal, a channel current flowing through an LED channel, and an output voltage at an operational amplifier. In FIG. 1, (b) is an enlarged illustration of a section in which the pulse width modulation signal transits from a high level to a low level in the waveform diagram of (a).

Referring to FIG. 1, the pulse width modulation PWM signal is a high pulse signal having a certain period. The operational amplifier outputs a high level output voltage Va for a period in which the pulse width modulation PWM signal is a low level. A channel current ILED flows through the LED channel for the period in which the output voltage Va at the operational amplifier is a high level for a predetermined time.

However, as shown in (b), when the pulse width modulation PWM signal descends from a high level to a low level, the output voltage Va at the operational amplifier does not rise according to the pulse width modulation PWM signal. It has the predetermined delay time. This is because of a power-on delay of the operational amplifier. Due to this, the predetermined delay is generated in the channel current ILED.

That is, there is a problem that the output voltage Va at the operational amplifier and a slew rate of the channel current ILED are degraded. Moreover, in order to solve the power-on delay of the operational amplifier, a large current can be supplied to the operational amplifier. But this generates unnecessary power consumption.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is to solve the above described problems, and the present invention has been made in an effort to provide an LED light emitting device and a driving method for improving a slew rate of the channel current flowing through an LED channel when driving with a pulse width modulation method.

An LED light emitting device includes an LED channel consisting of a plurality of LED elements that are consecutively and serially connected, a current control switch connected to a second LED channel and that performs a switching operation, and an LED driver including an operational amplifier controlling a switching operation of the current control switch according to a pulse width modulation signal. The LED driver samples an output voltage of the operational amplifier when the pulse width modulation signal is in an on state, and when the pulse width modulation signal is in an off state, the output voltage of the operational amplifier is maintained according to the sampling voltage.

Additionally, the LED light emitting device further includes a capacitor in which the sampling voltage is charged when the pulse width modulation signal is in an on state, and when the pulse width modulation signal is in an off state, the operational amplifier outputs a charged voltage at the capacitor. The LED light emitting device further includes a first switching unit that connects the capacitor to a first input terminal of the operational amplifier and a second input terminal of the operational amplifier to an output terminal of the operational amplifier when the pulse width modulation signal is in an off state.

The first switching unit includes a first transmission gate connecting the capacitor to the first input terminal of the operational amplifier, a second transmission gate connecting the output terminal of the operational amplifier to the second input terminal of the operational amplifier, and a connection control switch grounding a gate terminal of the current control switch. The LED light emitting device further includes a reference current source generating a predetermined reference current, a reference resistor of which one terminal is connected to the reference current source and the other terminal is grounded, and a detection resistor of which a one terminal is connected to the current control switch and the other terminal is grounded.

The LED light emitting device further includes a second switching unit that, when the pulse width modulation signal is in an on state, connects the first input terminal of the operational amplifier to the one terminal of the reference resistor, the second input terminal of the operational amplifier to the one terminal of the detection resistor, and the output terminal of the operational amplifier to the gate terminal of the current control switch and the capacitor. The second switching unit includes a first transmission gate connecting the one terminal of the reference resistor to the first input terminal of the operational amplifier, a second transmission gate connecting the capacitor to the output terminal of the operational amplifier, a third transmission gate connecting the one terminal of the detection resistor to the second input terminal of the operational amplifier, and a fourth transmission gate connecting the output terminal of the operational amplifier to the gate terminal of the current control switch.

A driving method of the LED light emitting device, which includes an LED channel consisting of a plurality of LED elements that are consecutively and serially connected and a current control switch connected to a second LED channel and performing a switching operation, and an LED driver including an operational amplifier controlling a switching operation of the current control switch according to a pulse width modulation signal, includes a step that samples an output voltage of the operational amplifier when the pulse width modulation signal is in an on state, and a step in which the output voltage of the operational amplifier is maintained according to the sampling voltage when the pulse width modulation signal is in an off state.

The driving method of the LED light emitting device further includes a step in which the sampling voltage is charged to a capacitor when the pulse width modulation signal is in an on state. The step in which the output voltage of the operational amplifier is sampled includes a step in which a predetermined reference voltage is input to the first input terminal of the operational amplifier, a step in which a predetermined detection voltage according to the channel current is input to the second input terminal of the operational amplifier, and a step in which the capacitor is connected to the output terminal of the operational amplifier.

The step in which the output voltage of the operational amplifier is maintained according to the sampling voltage includes a step in which the capacitor is connected to the first input terminal of the operational amplifier, a step in which the second input terminal of the operational amplifier is connected to the output terminal of the operational amplifier, and a step in which the current control switch is turned off.

As described above, according to the present invention, when driving by a pulse width modulation method, a slew rate of a channel current flowing through an LED channel may be improved.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements.

Figure 2:
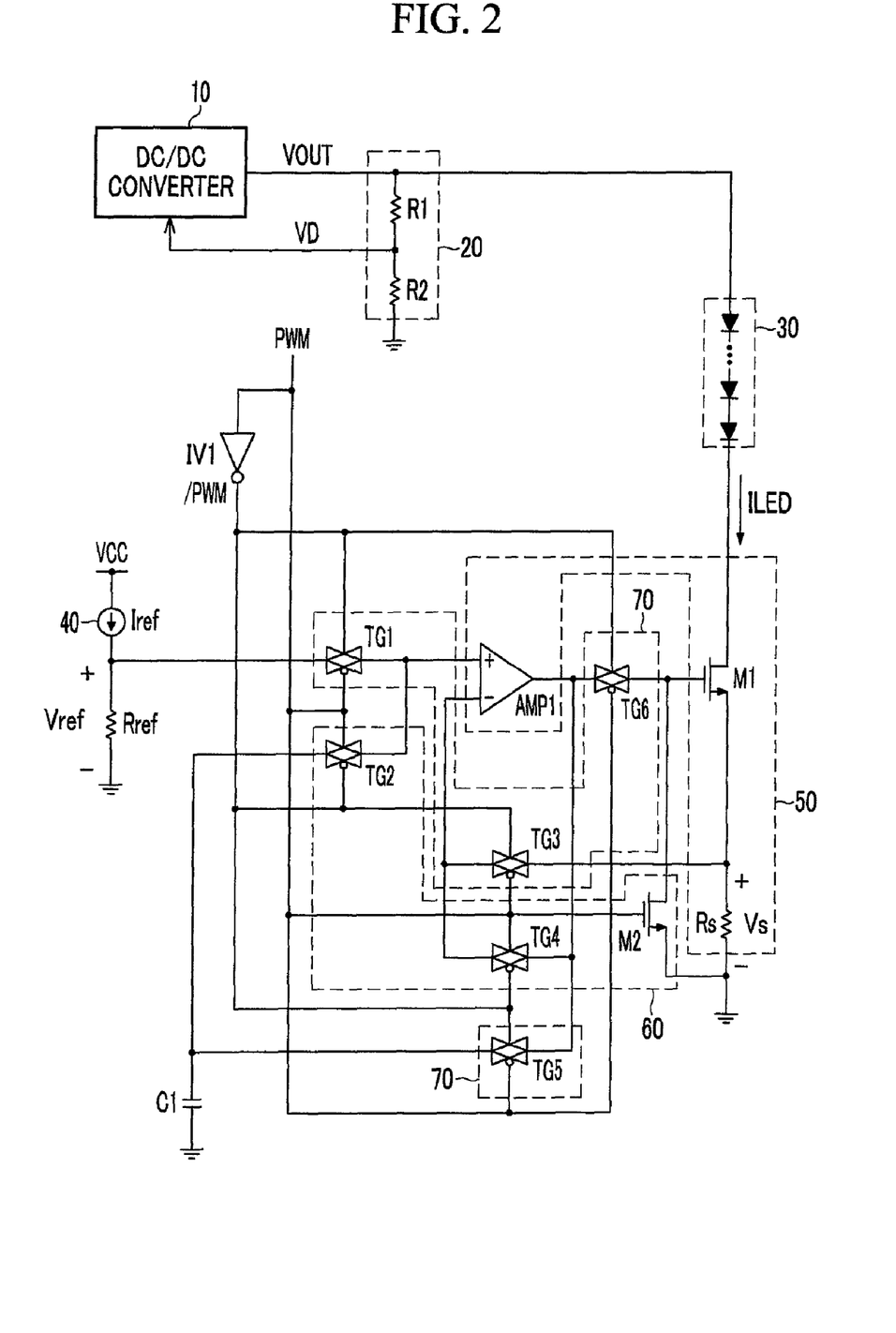
FIG. 2 is a circuit diagram showing an LED light emitting device according to an exemplary embodiment of the present invention.

FIG. 2 is a circuit diagram showing an LED light emitting device according to an exemplary embodiment of the present invention.

Referring to FIG. 2, the LED light emitting device includes a DC/DC converter 10, a resistor divider 20, an LED channel 30, a reference current source 40, a reference resistor Rref, an inverter IV1, a capacitor C1, an LED driver 50, and first and second switching units 60 and 70.

The DC/DC converter 10 inputs an input voltage Vin and produces an output voltage VOUT having a predetermined level. The DC/DC converter 10 senses a dividing voltage VD and controls the output voltage VOUT.

The resistor divider 20 divides the output voltage VOUT at the DC/DC converter 10 with resistors and outputs the dividing voltage VD. The resistor divider 20 includes resistors R1 and R2. The resistor R1 and the resistor R2 are serially connected between an output terminal and a ground terminal of the DC/DC converter 10.

The LED channel 30 includes a plurality of LED elements that are consecutively connected in series. The reference current source 40 produces a reference current Iref. One terminal of the reference resistor Rref is connected to the reference current source 40 and the other terminal of the reference resistor Rref is grounded.

Since the reference current Iref flows through the reference resistor Rref, the reference voltage Vref is generated in the one terminal of the reference resistor Rref. That is, the reference voltage Vref is determined according to the reference current Iref and the reference resistor Rref.

A one terminal of the capacitor C1 is connected between a transmission gate TG2 and a transmission gate TG5. The other terminal of the capacitor C1 is grounded. The inverter IV1 inverts the pulse width modulation signal and outputs the inversion pulse width modulation signal. The pulse width modulation signal is a high pulse signal having a predetermined period. Luminous output of a plurality of LED elements of the LED channel 30 is controlled according to the high pulse width of the pulse width modulation signal.

When the pulse width modulation signal is a high level (hereinafter, an off state), the LED driver 50 blocks the channel current ILED flowing through the LED channel 30. When the pulse width modulation signal is a low level (hereinafter, an on state), the LED driver 50 controls the size of the channel current ILED flowing through the LED channel 30 according to the reference current Iref. When the pulse width modulation signal is in an off state, the output voltage Va at the operational amplifier AMP1 is controlled by a charge voltage Vc of the capacitor C1.

The LED driver 50 includes an operational amplifier AMP1, a current control switch M1, and a detection resistor Rs. The operational amplifier AMP1 controls a switching operation of the current control switch M1 according to the pulse width modulation signal. A non-inversion input terminal (+) of the operational amplifier AMP1 is connected to a transmission gate TG1 and the transmission gate TG2. An inversion input terminal (−) is connected to a transmission gate TG3 and a transmission gate TG4. An output terminal OUT of the operational amplifier AMP1 is connected to the transmission gate TG5 and a transmission gate TG6.

A drain terminal of the current control switch M1 is connected to an end of the LED channel 30, and a source terminal of the LED channel 30 is connected to one terminal of the detection resistor Rs. The other terminal of the detection resistor Rs is grounded. Since the channel current ILED flows into the detection resistor Rs through the current control switch M1, a detection voltage Vs is generated in the one terminal of the detection resistor Rs.

When the pulse width modulation signal is in an off state, the first switching unit 60 connects the capacitor C1 to the non-inversion input terminal (+) of the operational amplifier AMP1 and connects the inversion input terminal (−) of the operational amplifier AMP1 and the output terminal. Further, the first switching unit 60 grounds a gate terminal of a connection control switch M2. The first switching unit 60 includes transmission gates TG2 and TG4, and a connection control switch M2.

When the pulse width modulation signal is in an on state, the second switching unit 70 connects the capacitor C1 and the gate terminal of the connection control switch M2 to the output terminal OUT of the operational amplifier AMP1, the non-inversion input terminal (+) of the operational amplifier AMP1 to the one terminal of the reference resistor Rref, and the inversion input terminal (−) of the operational amplifier AMP1 to the one terminal of the detection resistor Rs.

The second switching unit 70 includes transmission gates TG1, TG3, TG5, and TG6. A detailed configuration of the second switching unit 70 and the first switching unit 60 will be described as follows. The plurality of transmission gates TG1~TG5 are made of different types, and for example may be NMOSFETs or PMOSFETs.

The plurality of transmission gates TG1 to TG5 are respectively controlled by a pulse width modulation signal and an inversion pulse width modulation signal. In detail, when the pulse width modulation signal is a low level and the inversion pulse width modulation signal is a high level, the transmission gate TG1 is turned on and connects the one terminal of the reference resistor Rref to the non-inversion input terminal (+) of the operational amplifier AMP1.

When the pulse width modulation signal is a high level and the inversion pulse width modulation signal is a low level, the transmission gate TG2 is turned on and connects the one terminal of the capacitor C1 to the non-inversion input terminal (+) of the operational amplifier AMP1.

When the pulse width modulation signal is at a low level and the inversion pulse width modulation signal is at a high level, the transmission gate TG3 is turned on and connects the detection resistor Rs to the inversion input terminal (−) of the operational amplifier AMP1.

When the pulse width modulation signal is a high level and the inversion pulse width modulation signal is a low level, the transmission gate TG4 is turned on and connects the output terminal OUT of the operational amplifier AMP1 to the inversion input terminal (−) of the operational amplifier AMP1.

When the pulse width modulation signal is a low level and the inversion pulse width modulation signal is a high level, the transmission gate TG5 is turned on and connects the one terminal of the capacitor C1 to the output terminal OUT of the operational amplifier AMP1.

When the pulse width modulation signal is a low level and the inversion pulse width modulation signal is a high level, the transmission gate TG6 is turned on and connects the output terminal OUT of the operational amplifier AMP1 to the gate terminal of the current control switching M1.

The connection control switch M2 connects the gate terminal of the current control switch M1 to one between the transmission gate TG6 and the grounded terminal according to the pulse width modulation signal.

When the pulse width modulation signal is a low level, the connection control switch M2 connects the gate terminal of the current control switch M1 to the transmission gate TG6.

When the pulse width modulation signal is a high level, the connection control switch M2 connects the gate terminal of the current control switch M1 to the grounded terminal.

Figure 3:
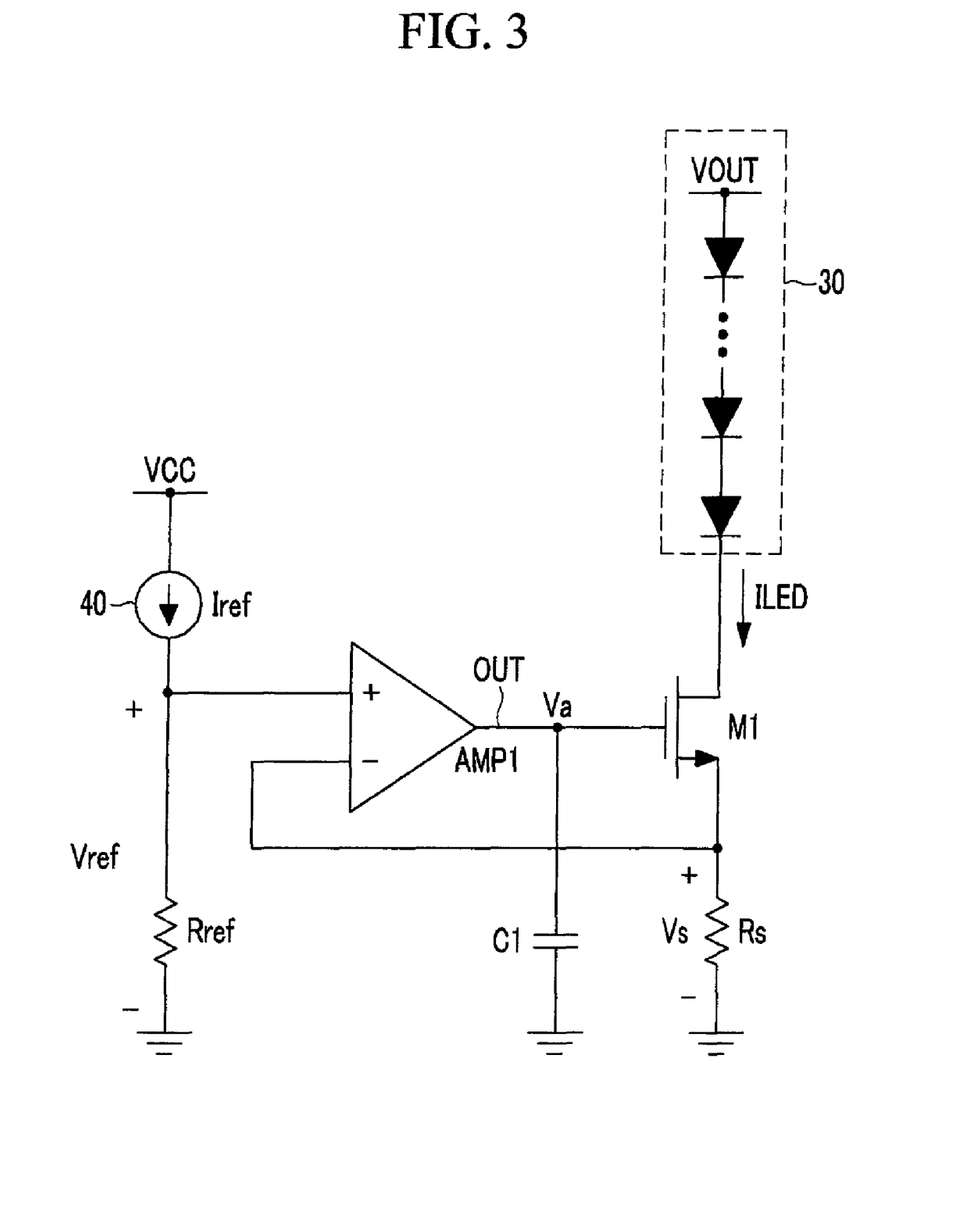
FIG. 3 is a drawing illustrating a driving method of the LED light emitting device when a pulse width modulation PWM signal is in an on state.

FIG. 3 is a drawing illustrating a driving method of the LED light emitting device when a pulse width modulation PWM signal is in an on state.

Additionally, FIG. 3 briefly shows a circuit of FIG. 2 according to a connected state of a plurality of the transmission gates TG1 to TG6. Referring to FIG. 3, for a period when the pulse width modulation signal is a low level, the transmission gates TG1, TG3, TG5, and TG6 are turned on, and the transmission gates TG2 and TG4 and the connection control switch M2 are turned off.

Then, the reference voltage Vref is input to the non-inversion input terminal (+) of the operational amplifier AMP1, and the detection voltage Vs is input to the inversion input terminal (−) of the operational amplifier AMP1.

The operational amplifier AMP1 outputs the output voltage Va to be the same as the reference voltage Vref with the detection voltage Vs. At this time, the output terminal OUT of the operational amplifier AMP1 is connected to the capacitor C1. The output voltage Va is sampled. When the pulse width modulation signal is in an on state, the charge voltage Vc of the capacitor C1 is the output voltage Va of the operational amplifier AMP1.

Figure 4:
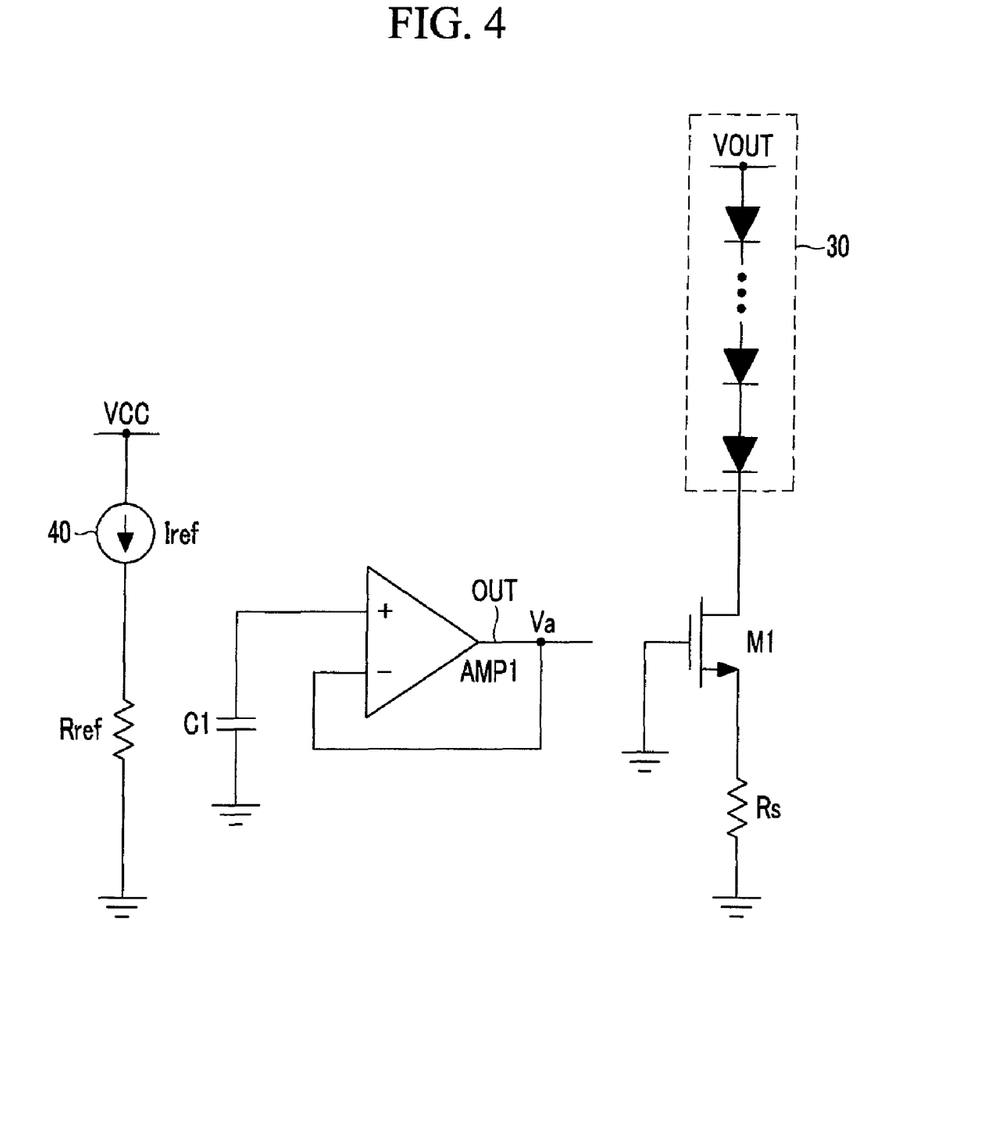
FIG. 4 is a drawing illustrating a driving method of the LED light emitting device when a pulse width modulation PWM signal is in an off state.

FIG. 4 is a drawing illustrating a driving method of the LED light emitting device when a pulse width modulation PWM signal is in an off state.

Additionally, FIG. 4 briefly shows a circuit of FIG. 2 according to a connected state of a plurality of the transmission gates TG1 to TG6.

Referring to FIG. 4, for a period when the pulse width modulation signal is a high level, the transmission gates TG2 and TG4 and the connection control switch M2 are turned on, and the transmission gates TG1, TG3, TG5, and TG6 are turned off.

Then, the capacitor C1 and the non-inversion input terminal (+) of the operational amplifier AMP1 are connected, and the inversion input terminal (−) of the operational amplifier AMP1 and the output terminal OUT are connected. Accordingly, the output voltage Va of the operational amplifier AMP1 is determined according to the charge voltage Vc at the capacitor C1.

When the pulse width modulation signal is changed from the on state to the off state, the charge voltage Vc reduces to a voltage smaller than a voltage that is sampled when the pulse width modulation signal is in an on state.

Figure 5A:
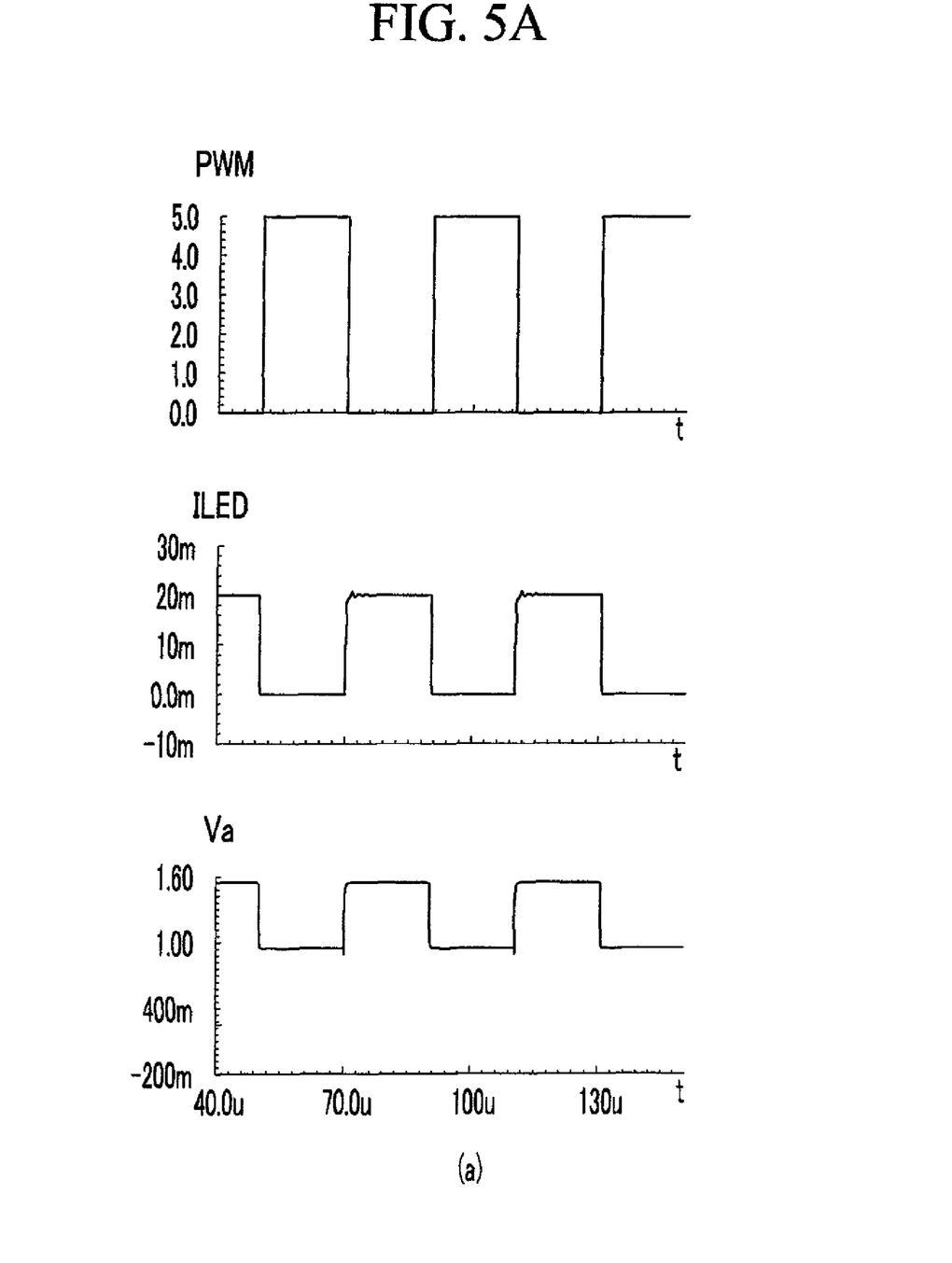
FIG. 5A is a waveform diagram showing a pulse width modulation signal, a channel current flowing through an LED channel, and an output signal at an operational amplifier according to an exemplary embodiment of the present invention.

FIG. 5A is a waveform diagram showing a pulse width modulation signal, a channel current flowing through an LED channel, and an output signal at an operational amplifier according to an exemplary embodiment of the present invention.

Figure 5B:
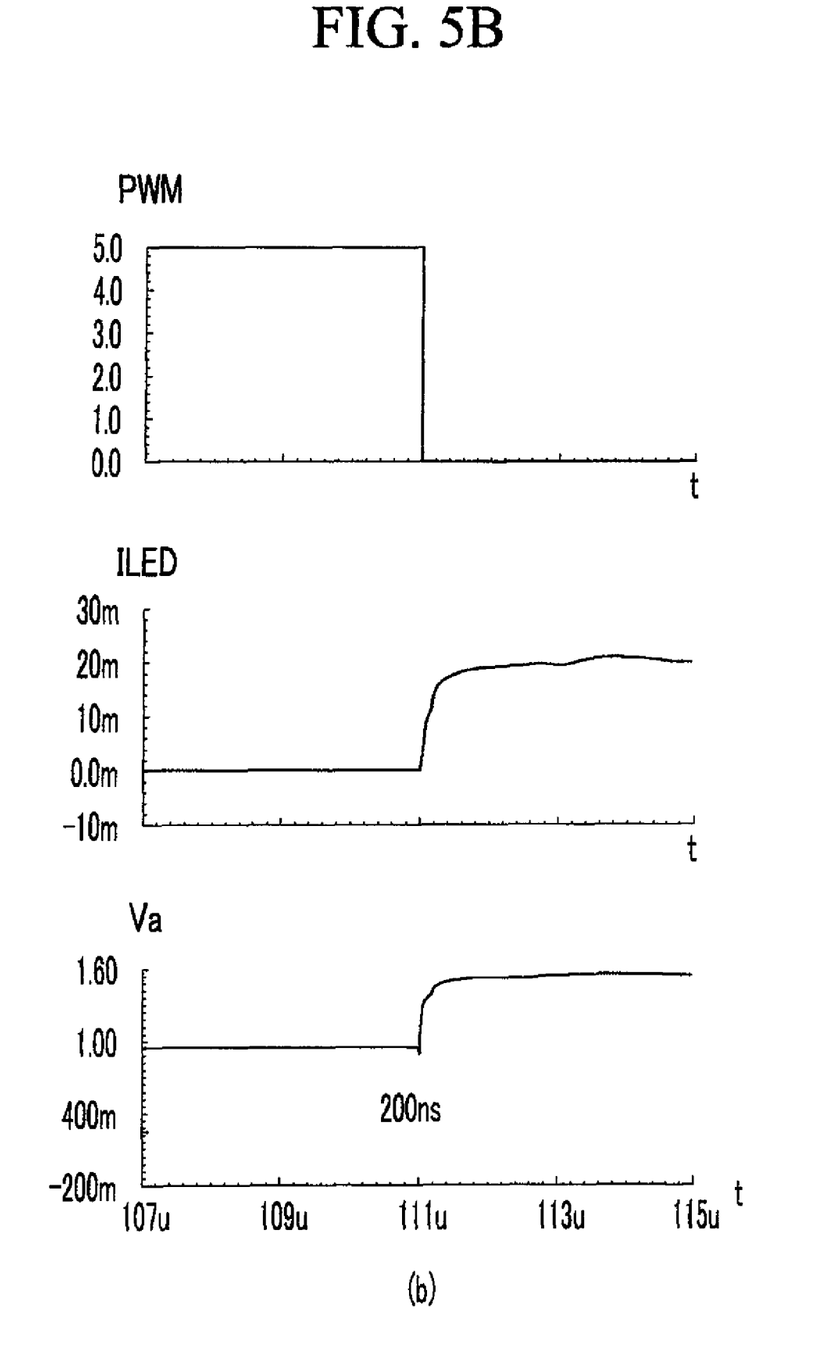
FIG. 5B is a waveform diagram showing a pulse width modulation signal, a channel current flowing through an LED channel, and an output signal at an operational amplifier according to an exemplary embodiment of the present invention.

FIG. 5B is a waveform diagram showing a pulse width modulation signal, a channel current flowing through an LED channel, and an output signal at an operational amplifier according to an exemplary embodiment of the present invention.

FIG. 5B illustrates an enlarged period in which the pulse-width modulation signal transits from a high level to a low level in a waveform diagram of FIG. 5A.

Referring to FIGS. 5A and 5B, for a period when the pulse width modulation signal is a high level, the output voltage Va of the operational amplifier AMP1 is maintained as the charge voltage Vc.

As shown in FIGS. 5A and 5B, the charge voltage Vc is low in comparison with a period when the pulse width modulation signal is a low level. When the pulse width modulation signal is changed from a high level to a low level, the output voltage Va of the operational amplifier AMP1 rapidly rises.

According to this, the output voltage Va of the operational amplifier AMP1 and a slew rate of the channel current ILED may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An LED light emitting device comprising:
    an LED channel consisting of a plurality of LED elements that are consecutively and serially connected; and
    a current control switch connected to a second LED channel and performing a switching operation;
    and an LED driver including a operational amplifier controlling a switching operation of the current control switch according to a pulse width modulation signal, wherein
    the LED driver samples an output voltage of the operational amplifier when the pulse width modulation signal is in an on state, and when the pulse width modulation signal is in an off state, the output voltage of the operational amplifier is maintained according to the sampling voltage.

2. The LED light emitting device of claim 1, further comprising
    a capacitor to which the sampling voltage is charged when the pulse width modulation signal is in an on state, and when the pulse width modulation signal is in an off state, the operational amplifier outputs a charge voltage at the capacitor.

3. The LED light emitting device of claim 2, further comprising
    a first switching unit that connects the capacitor to a first input terminal of the operational amplifier and a second input terminal of the operational amplifier to an output terminal of the operational amplifier when the pulse width modulation signal is in an off state.

4. The LED light emitting device of claim 3, wherein the first switching unit comprises:
    a first transmission gate connecting the capacitor to the first input terminal of the operational amplifier;
    a second transmission gate connecting the output terminal of the operational amplifier to the second input terminal of the operational amplifier; and
    a connection control switch grounding a gate terminal of the current control switch.

5. The LED light emitting device of claim 2, further comprising:
    a reference current source generating a predetermined reference current;
    a reference resistor of which one terminal is connected to the reference current source and the other terminal is grounded; and
    a detection resistor of which one terminal is connected to the current control switch and the other terminal is grounded.

6. The LED light emitting device of claim 5, further comprising
    a second switching unit that, when the pulse width modulation signal is in an on state, connects the first input terminal of the operational amplifier to the one terminal of the reference resistor, the second input terminal of the operational amplifier to the one terminal of the detection resistor, and the output terminal of the operational amplifier to the gate terminal of the current control switch and the capacitor.

7. The LED light emitting device of claim 6, wherein the second switching unit comprises:
    a first transmission gate connecting the one terminal of the reference resistor to the first input terminal of the operational amplifier;
    a second transmission gate connecting the capacitor to the output terminal of the operational amplifier;
    a third transmission gate connecting the one terminal of the detection resistor to the second input terminal of the operational amplifier; and
    a fourth transmission gate connecting the output terminal of the operational amplifier to the gate terminal of the current control switch.

8. A driving method of the LED light emitting device, comprising
    an LED channel consisting of a plurality of LED elements that are consecutively and serially connected, a current control switch connected to a second LED channel and performing a switching operation, and an LED driver including an operational amplifier controlling a switching operation of the current control switch according to a pulse width modulation signal, wherein:
    a step in which an output voltage of the operational amplifier is sampled when the pulse width modulation signal is in an on state; and
    a step in which the output voltage of the operational amplifier is maintained according to the sampling voltage when the pulse width modulation signal is in an off state.

9. The driving method of the LED light emitting device of claim 8, further comprising
    a step in which the sampling voltage is charged to a capacitor when the pulse width modulation signal is in an on state, and
    the step in which the output voltage of the operational amplifier is sampled comprises:
    a step in which a predetermined reference voltage is input to the first input terminal of the operational amplifier;
    a step in which a predetermined detection voltage according to the channel current is input to the second input terminal of the operational amplifier; and
    a step in which the capacitor is connected to the output terminal of the operational amplifier.

10. The driving method of the LED light emitting device of claim 9, wherein
    the step in which the output voltage of the operational amplifier is maintained according to the sampling voltage comprises:
    a step in which the capacitor is connected to the first input terminal of the operational amplifier;

a step in which the second input terminal of the operational amplifier is connected to the output terminal of the operational amplifier; and a step in which the current control switch is turned off.

* * * * *